Patented Aug. 11, 1953

2,648,683

UNITED STATES PATENT OFFICE 2,648,683

4-HYDROXYCOUMARIN DERIVATIVES

Franz Litvan and Willy Stoll, Basel, Switzerland, assignors to J. R. Geigy A. G., Basel, Switzerland, a Swiss firm No Drawing. Application May 16, 1952, Serial No. 288,307. In Switzerland June 5, 1951

3 Claims. (Cl. 260—343.2)

The present invention is concerned with new condensation products of 4-hydroxycoumarin and heterocyclic aldehydes. It has now been found that 3.3'-furfural-bis-4-hydroxycoumarins of the general formula:

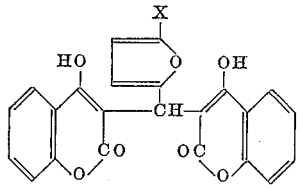

wherein X represents hydrogen, chlorine or bromine, have a strong retarding action on the coagulation of the blood of considerably less duration than that of 3.3'-methylene-bis-4-hydroxycoumarin which is already in therapeutical use, so that an important disadvantage of this latter compound is eliminated.

The new compounds can be produced by condensing furfurol 5-chloro- or 5-bromo-furfurol with two molecules of 4-hydroxycoumarin.

The condensation of the aldehydes with 4-hydroxycoumarin can be performed by heating in organic solvents such as e. g. methanol, ethanol, dioxan. Good yields are obtained.

The following examples further illustrate the production of the new compounds.

Example 1

10 parts by weight of furfurol and 33 parts by weight of 4-hydroxycoumarin are boiled under reflux for 8 hours in 150 parts by volume of methanol. The raw product is filtered off hot under suction, washed with hot methanol and recrystallised from dioxan-methanol to obtain 3.3'-furfural-bis-4-hydroxycoumarin. It melts at 200–206° C. on decomposition.

Example 2

42 parts of 5-chlorofurfurol and 105 parts of 4-hydroxycoumarin in 400 parts by volume of methanol are boiled for 14 hours under reflux. After cooling, a crystal mass separates out and the 3.3'-(5"-chlorofurfural)-bis-4-hydroxycoumarin is purified by crystallisation from nitrobenzene with the addition of toluene. M. P. 214–215° C. on decomposition.

5-bromofurfurol (obtained by brominating furfurol diacetate according to Henry Gilman and George F. Wright, J. Am. Chem. Soc. 52, 1170 (1930)) can also be condensed with 2 molecules of 4-hydroxycoumarin to form 3.3'-(5"-bromofurfural)-bis-4-hydroxycoumarin in the same way.

What we claim is:

1. A derivative of 4-hydroxycoumarin corresponding to the formula:

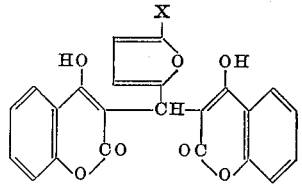

wherein X represents a member selected from the group consisting of hydrogen, chlorine and bromine.

2. A derivative of 4-hydroxycoumarin corresponding to the formula:

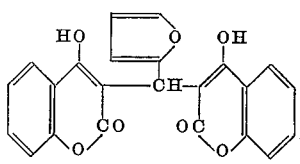

3. A derivative of 4-hydroxycoumarin corresponding to the formula:

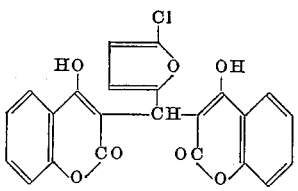

FRANZ LITVAN.
WILLY STOLL.

No references cited.